June 16, 1964   N. F. WIKNER   3,137,636
REACTOR FUEL ELEMENT CONTAINING ABSORBER
Filed Aug. 2, 1961   2 Sheets-Sheet 1
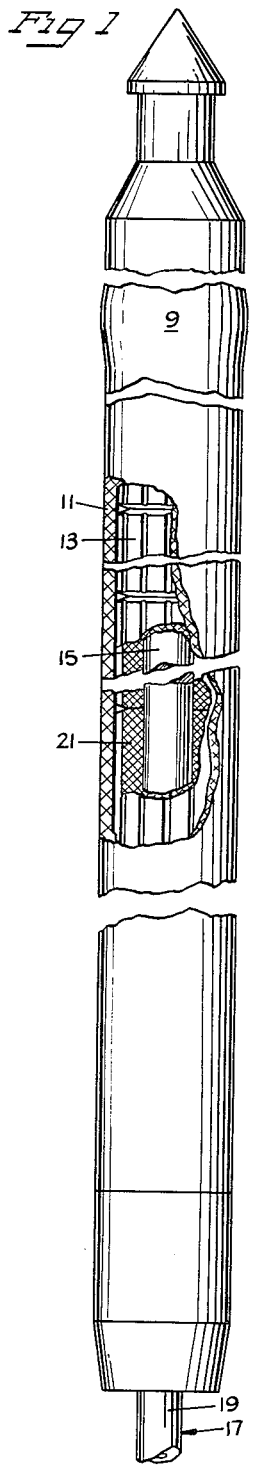
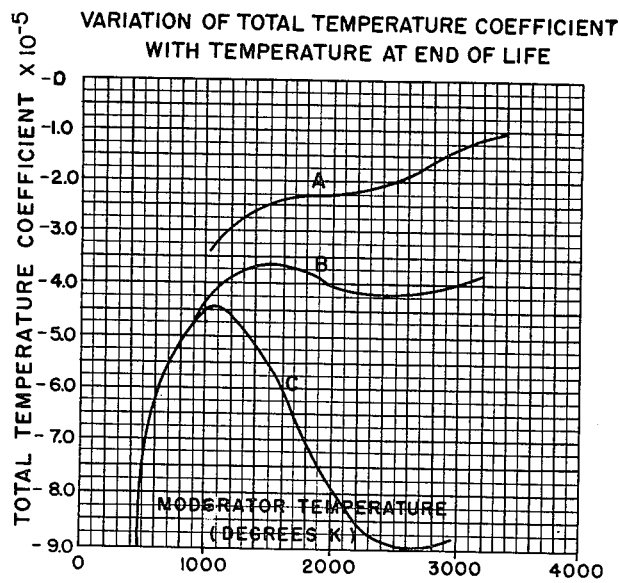
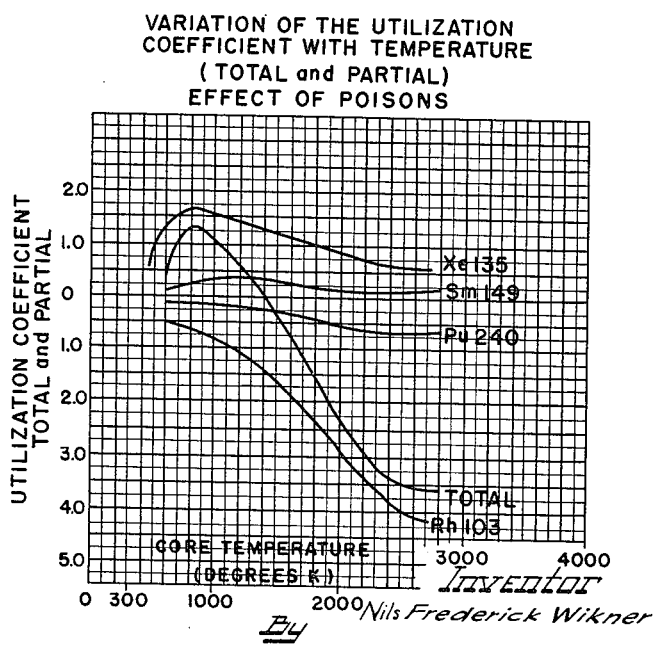
Inventor
Nils Frederick Wikner
By
Roland A. Anderson
Atty United States Patent Office 3,137,636
Patented June 16, 1964

3,137,636
REACTOR FUEL ELEMENT CONTAINING ABSORBER
Nils Fredrick Wikner, Rancho Santa Fe, Calif., assignor, by mesne assignments, to the United States of America as represented by the United States Atomic Energy Commission
Filed Aug. 2, 1961, Ser. No. 128,914
5 Claims. (Cl. 176—68)

The present invention generally relates to high temperature nuclear reactors and more particularly relates to a high temperature nuclear reactor having improved safety characteristics.

In order to sustain a chain reaction in a nuclear reactor, each nucleus in the reactor core which captures a neutron and undergoes fission must produce, on the average, at least one neutron which in turn causes fission of another nucleus in the reactor. A convenient manner of expressing this condition is in terms of an effective reproduction or multiplication factor $K_{eff}$ which may be defined as the ratio of the number of neutrons produced by fission in any one generation to the number of corresponding neutrons in the previous generation. The reactor is said to be critical when the effective multiplication factor is exactly unity, so that a chain reaction will be maintained at a constant rate of fission and at a given power level. If the effective multiplication factor exceeds one, the system is said to be super-critical, and if it is less than one, the system is said to be sub-critical.

It is also convenient in discussing the characteristics of a nuclear reactor to refer to what is called the reactivity P, which may be defined by the relationship $$P = \frac{K_{eff} - 1}{K_{eff}} \quad [1]$$

There is need for excess reactivity in a reactor in order to bring the reactor up to a desired operating power level and also to compensate for the build-up of thermal neutron-absorbing materials in the system. In the latter regard, as fissioning proceeds, fission products which absorb thermal neutrons accumulate in the system and, accordingly, tend to decrease the reactivity of the system. The amount of excess reactivity initially needed in the reactor depends upon many factors. With high power level reactors, such as high temperature gas-cooled graphite reactors and the like, considerable excess reactivity is useful.

However, it is important to control excess reactivity in a safe manner. If excess reactivity is suddenly introduced into a reactor system, the reactor increases in power, and if not controlled it can result in a violent increase in the heat generated in the system and consequent damage to the reactor and operating personnel. In order to prevent such an occurrence, it is conventional to include certain safety measures. Control rods are provided in the reactor, which control rods contain thermal neutron absorbing materials or poisons. The control rods can be inserted and withdrawn from the reactor as needed, in controlling power levels in the reactor.

Moreover, various burnable poisons have been suggested for use in nuclear reactors to compensate for the build-up of fission product poisons in the system. Thus, burnable poisons may be added to the reactor system to aid in compensating for the high initial excess reactivity required in the system. The concentration of burnable poisons initially added to the reactor is such that the burnable poisons are burned up in the reactor at a rate comparable to the rate of build-up of the fission product poisons during operation of the reactor.

To prevent the power level of a reactor from exceeding a safe level it is desirable to provide improved means for controlling excess reactivity, particularly in high temperature high power level nuclear reactors in view of the relatively large excess reactivity which may be utilized in such systems.

Gas-cooled high temperature nuclear reactors are particularly attractive in that they offer the possibility, at high temperatures, of increasing the thermal efficiency of heat transfer from the reactor core to the coolant so as to provide higher power levels in an efficient manner.

To provide a reactor with the desired safety characteristics, it is desirable for the reactivity of the reactor to decrease as the reactor temperature increases, particularly above the normal operating temperature of the reactor. Such a reactor would have a negative temperature coefficient of reactivity. If, instead, the reactivity of a reactor were to increase with increasing temperature, it would have a positive temperature coefficient of reactivity.

If a reactor were provided with a sufficiently large prompt negative temperature coefficient of reactivity to prevent the reactor from an excessive or damaging power surge if all of the excess reactivity were suddenly dumped into the reactor, the reactor would be substantially safe. By a prompt temperature coefficient is meant one that does not require the flow of reactor heat from one region to another in order to have it come into play.

Most thermal neutron absorbing materials or poisons which could result in a prompt negative temperature coefficient of reactivity in the reactor are useful only in a limited manner. For example, some poisons are chemically unstable at elevated temperatures or are incompatible with other nuclear reactor components. Other poisons are effective only at relatively low temperatures below the normal operating temperature of a high temperature reactor operating at, for example, about 1200° C. or about 1475° K. fuel temperature.

It is also important in considering thermal neutron absorbing materials which could furnish a prompt negative contribution to the temperature coefficient of reactivity of the reactor at elevated temperatures to determine the sign and magnitude of the contribution to the temperature coefficient of reactivity of the reactor at temperatures encountered during start-up of the reactor (i.e., temperatures below the normal operating temperature of the reactor), and at normal operating temperatures for the reactor. It is desirable that such neutron absorbing material not capture a large number of neutrons at or below the operating temperature of the reactor so as not to interfere with the neutron economy of the reactor.

Improved means comprising selected thermal neutron absorbing poisons added to the reactor in controlled concentrations have now been discovered for improving the safety characteristics of high temperature nuclear reactors, i.e., reactors having operating temperatures above about 1200° C. In accordance with the present invention, a high temperature reactor having improved safety characteristics is provided.

Accordingly, a primary object of the present invention is to impart improved safety characteristics to high temperature nuclear reactors, particularly to high temperature graphite moderated nuclear reactors. It is a further object of the present invention to provide a high temperature nuclear reactor operating at temperatures of, for example, approximately 1200° C. fuel temperature, with a large prompt negative temperature coefficient of reactivity. It is also an object of the present invention to provide a high temperature nuclear reactor with a prompt negative temperature coefficient of reactivity for temperatures in excess of the operating temperature of the reactor, so that the safety characteristics of the reactor are increased.

It is a further object of the present invention to provide improved fuel elements for a high temperature nuclear reactor which fuel elements incorporate means for imparting to the nuclear reactor a large prompt negative temperature coefficient of reactivity at temperatures above the normal operating temperature of the reactor.

It is also an object to provide a high temperature reactor with a substantial negative contribution to the temperature coefficient of reactivity only at elevated temperatures.

Further objects and advantages of the present invention will be apparent from a study of the following detailed description and the accompanying drawings of which:

FIGURE 1 is a fragmentary side elevation of a preferred embodiment of a fuel element for a high temperature graphite moderated reactor which includes suitable neutron absorbing material to improve the safety characteristics of the reactor, portions of the fuel element being broken away to illustrate the internal construction thereof;

FIGURE 2 is a graph of the variation with temperature of the total temperature coefficient of reactivity of three embodiments of a high temperature graphite moderated reactor, and illustrates the effect of incorporating improved safety characteristics in accordance with the present invention;

FIGURE 3 is a graph of the variation with temperature of the utilization coefficient of one form of high temperature graphite moderated reactor incorporating improved safety characteristics in accordance with the present invention;

Figure 4:
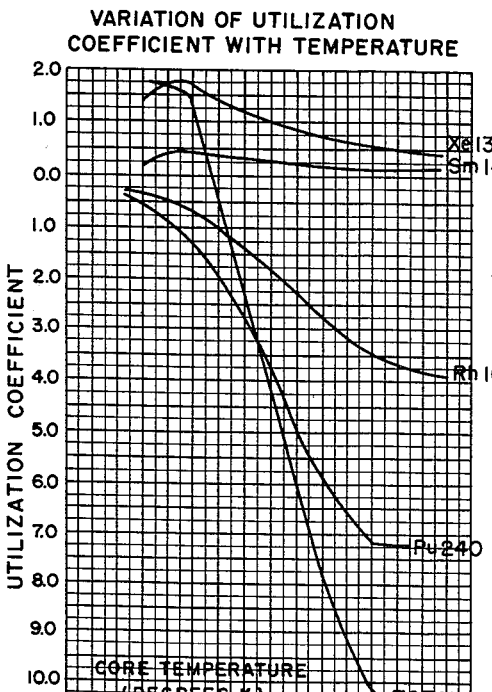
Figure 5:
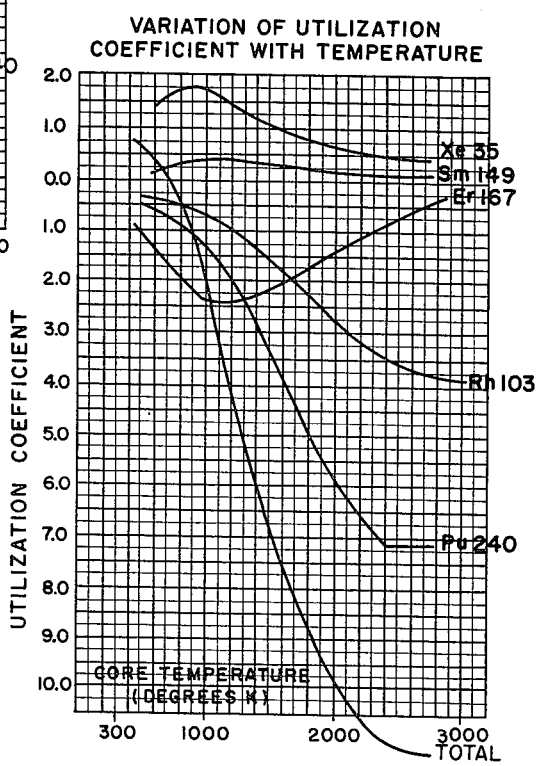

FIGURE 4 is a graph of the variation with temperature of the utilization coefficient of another embodiment of a high temperature graphite moderated reactor incorporating improved safety characteristics in accordance with the present invention; and FIGURE 5 is a graph of the variation with temperature of the utilization coefficient of a third embodiment of a high temperature graphite moderated reactor incorporating improved safety characteristics in accordance with the present invention.

The present invention includes a method of improving the safety characteristics of a nuclear reactor, particularly a high temperature graphite moderated reactor, by providing within the reactor selected thermal neutron absorbing poisons in an amount sufficient to impart to the reactor a substantial prompt negative contribution to the temperature coefficient of reactivity of the reactor at elevated temperatures. The poisons have chemical stability at elevated temperatures and are compatible with other components of the reactor. Moreover, they do not materially interfere with the neutron economy of the reactor at normal operating temperatures.

Advantages of utilizing selected neutron absorbing materials or poisons in the reactor in accordance with the present invention will be apparent from the following discussion.

In a nuclear reactor the multiplication factor K can be written as follows:

$$K = \eta f p \epsilon P_T P_F \qquad [2]$$

where $\eta$ is the average number of fission spectrum neutrons produced per thermal absorption in the fuel, $f$ is the ratio of the number of thermal neutrons absorbed in the fuel to the total number of thermal neutrons absorbed by any process, $p$ is the fraction of source neutrons which reach thermal energies, i.e., the neutrons which do not leak from the reactor core as fast neutrons, i.e., >1.9 e.v., and which escape resonance capture in the reactor, $\epsilon$ is the ratio of the total number of fissions to the thermal fissions, $P_T$ and $P_F$ are the non-leakage probabilities for thermal and fast neutrons respectively. The total temperature coefficient of reactivity of the reactor is defined by differentiating Equation 2 above to give:

$$\frac{1}{K}\frac{\partial K}{\partial T} = \frac{1}{\eta}\frac{\partial \eta}{\partial T} + \frac{1}{f}\frac{\partial f}{\partial T} + \frac{1}{\epsilon}\frac{\partial \epsilon}{\partial T} + \frac{1}{p}\frac{\partial p}{\partial T} + \frac{1}{P_T}\frac{\partial P_T}{\partial T} + \frac{1}{P_F}\frac{\partial P_F}{\partial T} \qquad [3]$$

It has been found that for high temperature graphite moderated reactors, the coefficients $$\frac{1}{p}\frac{\partial p}{\partial T}$$

and $$\frac{1}{P_T}\frac{\partial P_T}{\partial T}$$

are negative at all times in life and at all moderator temperatures. The coefficient $$\frac{1}{\eta}\frac{\partial \eta}{\partial T}$$

however, can have either sign. It is negative at the beginning of life if only one of the major fuels is present but is usually positive for any mixture of uranium-233, uranium-235 and plutonium-239. For high temperature graphite moderated reactor systems, the coefficient $$\frac{1}{\epsilon}\frac{\partial \eta}{\partial T}$$

is always positive, since the fractional number of thermal fissions decreases with increasing temperature. Generally, $$\frac{1}{P_F}\frac{\partial P_F}{\partial T}$$

the coefficient for the non-leakage probability for fast neutrons is also positive. Very little can be done to change either the sign or magnitude of the $\eta$, $\epsilon$, and $P_F$ coefficients, since they are determined by the nuclear properties of the fuel and the details of the flux spectrum, in turn determined by the composition of the reactor.

It is highly desirable to influence one or more partial components of the temperature coefficient of reactivity in a manner to provide a total negative temperature coefficient of reactivity to the reactor at temperatures above its normal operating range.

It has been found that this can be accomplished through suitable control of the contributions of thermal neutron absorbing substances in the reactor system thus affecting the $f$ coefficient, i.e., $$\frac{1}{f}\frac{\partial f}{\partial T}$$

(generally referred to as the utilization coefficient) in Equation 2. Incorporation of a selected poison within the reactor system can significantly influence the sign and magnitude of the utilization coefficient and, accordingly, the sign and magnitude of the total temperature coefficient. It is possible to increase the negative temperature coefficient of the reactor through the use of the utilization coefficient when a significant amount of moderator is intimately mixed with the fuel. In this case prompt changes in fuel temperature results in prompt changes in the thermal neutron energy distribution yielding prompt negative contributions to reactivity if suitable poisons with large thermal resonances at thermal energies (i.e., above about .3 e.v.) are present.

Three poisons are particularly effective in influencing the utilization coefficient in a high temperature reactor and are capable of providing the system with a total negative temperature coefficient of reactivity over desired temperature ranges. These three thermal neutron absorbing materials are the following: plutonium-240, rhodium-103 and erbium-167. Each of these three neutron absorbers or poisons is readily available and has certain advantageous properties. Each of these three neutron absorbers is chemically stable at elevated temperatures above the normal operating temperature of a high temperature reactor, for example, above 1200° C. (about 1475° K.), and each is compatible with graphite and other components of a high temperature graphite moderated reactor. Each of these neutron absorbers provides a large prompt negative contribution to the temperature coefficient of reactivity at temperatures above about 1200° C. The contribution to the reactivity at lower temperatures is either positive or sufficiently low that the neutron economy at normal operating temperatures for such a reactor is not materially impaired by these neutron absorbers. The indicated neutron absorbers may be used singly or in any mixture and may be uniformly distributed at any desired plurality of points throughout the reactor.

It may be convenient to include the neutron absorbers directly within the fuel elements or the fuel compacts of the reactor. However, it should be understood that the neutron absorbers may be dispersed in other positions in the reactor, such as in moderator outside of the fuel elements. If the neutron absorber is dispersed within the fuel so as to immediately follow the temperature of the fuel, Doppler broadening of the thermal resonance bands of the absorber provides a further contribution to the prompt negative temperature coefficient of reactivity.

If moderating material is included in a fuel element, the neutron absorbing material may be distributed within such moderator, if desired. For example, one form of fuel element 9 for use in a high temperature graphite moderated reactor which may incorporate neutron absorbing material in accordance with the present invention is illustrated in FIGURE 1 of the accompanying drawings. This fuel element is adapted for use in a high temperature gas-cooled (HTGR) reactor such as is disclosed in United States patent application Serial Number 23,341, filed April 19, 1960.

The fuel element 9 comprises an annular outer container 11 fabricated of neutron moderating material having a low permeability to fission products, preferably low permeability graphite, within which are disposed a plurality of generally cylindrical fuel compacts 13. These compacts are a homogeneous mixture of graphite, fuel and fertile material. The permeability of the graphite container may be, for example, about $1 \times 10^{-5}$ cm.$^3$/sec. (to helium at room temperature). Such low permeability is effective in restricting migration of fission products therethrough.

The fuel compacts 13, as shown in FIGURE 1, are annular and are stacked upon an elongated, vertically disposed central spine 15 of neutron moderating material, such as graphite. The fuel element is supported within the reactor core (not shown) by a support stand-off 17, the stem 19 of which is indicated in FIGURE 1. A plurality of closely spaced vertically disposed fuel elements are arranged within a reactor tank (not shown) and are exposed to gaseous coolant, such as helium. In an HTGR type reactor system, such as disclosed in the above mentioned patent application, the fuel elements have a normal operating fuel temperature of about 1475° K. (1200° C.) and are capable of operating at temperatures of 1500° C. or more.

The fuel element 9 may, in accordance with this invention, contain desired amounts of one or more selected neutron absorbers uniformly distributed throughout the body of each of the fuel compacts 13. Alternatively, as indicated, the desired neutron absorbing material could be uniformly distributed within the central spine 15 of neutron moderating material, or in other locations inside or outside of the fuel elements in the reactor core.

The dispersal of the neutron absorbing material within the compacts may, for example, be carried out during fabrication of the compacts. Thus, compacts can be fabricated from a particulate mixture of graphite or other suitable high temperature thermal neutron moderating material, the neutron absorbing material, and nuclear fuel, that is, fissionable material or a mixture of fissionable and fertile material. For example, each fuel compact may be in the form of a ring contining a mixture of graphite, uranium-235 and uranium-238, with a suitable concentration of the selected neutron absorbing material initally added thereto.

Alternatively, plutonium-240 can be formed in situ in the fuel of the fuel elements in a sufficient concentration to provide the reactor with a prompt negative temperature coefficient of reactivity. This can be accomplished by providing a sufficiently high concentration of uranium-238 in the fuel. During operation of the reactor the following reactions take place to produce plutonium-240.

$$U^{238} + n \rightarrow U^{239} + \gamma$$
$$U^{239} \rightarrow \beta + Np^{239}$$
$$Np^{239} \rightarrow \beta + Pu^{239}$$
$$Pu^{239} + n \rightarrow Pu^{240} + \gamma$$

Inasmuch as plutonium-240 has a relatively rapid burnout rate, it is desirable to continuously produce at least a portion of the plutonium-240 in the indicated manner from uranium-238, to assure provision of a negative temperature coefficient of reactivity throughout the life of the reactor.

Parameters of a typical high temperature graphite moderated reactor incorporating the described fuel elements are set forth in Table I below:

TABLE I

*Technical Data for a High-Temperature Gas-Cooled (HTGR) Reactor Which May Incorporate the Fuel Elements Shown in FIGURE 1*

| | |
|---|---|
| Reactor power | 115 mw. thermal energy. |
| Effective core diameter | 9.16 ft. |
| Active core height | 7.5 ft. |
| Number of fuel elements | 804. |
| Number of control rods | 36. |
| Number of emergency shutdown rods | 19. |
| Initial fuel loading | 184.8 kg. enriched uranium, 173.3 kg. U–235. |
| Initial thorium loading | 1987 kg. |
| Initial boron burnable poison loading | 950 g. |
| Initial rhodium loading | 5 kg. |
| C/Th/U atom ratio: | |
| 696 fuel elements with | 2126 C/9.57 Th/1.0 U. |
| 108 fuel elements (outside ring) with | 3511 C/15.94 Th/1.0 U. |
| Average moderator temperature | 900° C. |
| Average fuel compact temperature | 1200° C. |
| Maximum fuel compact temperature | 1500° C. |
| Initial thermal neutron flux | $4.01 \times 10^{13}$. |
| Initial total neutron flux | $16.55 \times 10^{13}$. |
| Initial conversion ratio | 0.563. |
| Average conversion ratio | 0.612. |
| Final conversion ratio | 0.704. |
| Fuel life at full power | 900 days. |

The total temperature coefficients at the end of reactor life for each of three embodiments of the indicated reactor, are set forth in accompanying FIGURE 2. Curve A of FIGURE 2 indicates the total temperature coefficient for the reactor when it does not include an initial loading of rhodium or other neutron absorbing material in accordance with the invention, and which has as the fuel approximately 7 atom percent of uranium-238 and approximately 93 atom percent of uranium-235. The total temperature coefficient, as thus illustrated by curve A, is slightly negative at the end of the reactor life, but becomes steadily less negative over substantially an entire temperature range of from about 1000° K. to about 3000° K.

Curve B of FIGURE 2 illustrates the same reactor as that represented in curve A but which includes an initial loading of rhodium-103 (5 kilograms at the beginning of reactor operation and an equilibrium mass of 3 kilograms at the end of reactor life). It is clearly evident from a comparison of curves A and B of FIGURE 2 that the addition of rhodium-103 to the nuclear reactor increases the negative temperature coefficient of the reactor.

Curve C relates to a third embodiment of the reactor, which embodiment includes the same amount of rhodium-103, as in the second embodiment (curve B), but where the fuel is only 50 percent enriched (50 atom percent uranium-239 and 50 atom percent uranium-235) instead of 93 percent enriched. In this case, a substantial amount of Pu-240 is formed in situ in the reactor during operation thereof. Further pronounced improvement in the negative temperature coefficient of the reactor, due to the presence of substantial amounts of both plutonium-240 and rhodium-103, is evident upon comparing curve C with curves B and A. The total temperature coefficient shown in curve C is substantially more negative than that of curves A and B for temperatures over about 1000° K.

The individual contributions of various neutron absorbing materials to the utilization coefficient of that embodiment of the reactor, the total temperature coefficient for which is set forth in curve B of FIGURE 2, are illustrated in FIGURE 3 of the accompanying drawings. As seen from FIGURE 3, fission products such as xenon-135 and samarium-149 provide a positive contribution to the utilization coefficient, while rhodium-103 provides a strong negative contribution to the utilization coefficient, so that the total utilization coefficient is negative at temperatures above about 1400° K. and steadily becomes more negative as the reactor temperature increases.

FIGURE 4 of the accompanying drawings illustrates the utilization coefficient of that embodiment of the reactor the total temperature coefficient of which is set forth in curve C of FIGURE 2. The total utilization coefficient, as set forth in FIGURE 4, is negative for temperatures above about 1150° K. and steadily becomes more negative as the reactor temperature increases up to well above 2500° K. It is more negative than that shown in FIGURE 3. In this case plutonium-240 (formed in substantial amounts in the reactor from the approximately 50 atom percent of uranium-238) provides a substantial negative contribution to the utilization coefficient.

FIGURE 5 of the accompanying drawings illustrates the utilization coefficient for a fourth embodiment of the nuclear reactor substantially identical with the embodiment represented in FIGURE 4 and in curve C of FIGURE 2 except that, in addition to the rhodium-103 present in approximately 3 kilogram amount and the approximately 50 atom percent concentration of uranium-238 in the fuel (with consequently substantial concentration of plutonium-240), erbium-167 is also present in approximately 1 kilogram amount. The total utilization coefficient set forth in FIGURE 5 is even more negative than that set forth in FIGURE 4, due to the added presence of the erbium-167. It can be seen from FIGURE 5 that erbium-167 makes a negative contribution to the utilization coefficient from about 400° K. to about 2800° K. Its maximum contribution is made at about 1100° K.

It will be understood that although the accompanying figures specifically relate to a particular type of high temperature graphite moderated reactor, the selected neutron absorbing materials, in accordance with the present invention, can be effectively utilized in other high temperature reactors having different parameters. Obviously, the relative concentrations of the selected poisons necessary to provide a sufficiently high utilization coefficient to, in turn, impart a prompt total negative temperature coefficient to a given reactor will vary, depending upon the reactor parameters. However, calculation of the relative concentrations of such materials needed to obtain a substantial negative contribution to the coefficient of reactivity can be made by a person versed in reactor physics.

As seen from FIGURES 3, 4 and 5 rhodium-103 and plutonium-240 contribute less strongly to a negative utilization coefficient at temperatures approximating the normal operating temperature of a high temperature graphite moderated reactor, that is, about 1450° K., than at higher temperatures. Thus, these neutron absorbers significantly contribute to a negative utilization coefficient and therefore to a total negative temperature coefficient at temperatures above the normal operating temperature of a high temperature graphite reactor, without materially interfering with neutron economy at normal operating temperatures.

As seen from the foregoing, the present invention provides a means for imparting a strong negative contribution to the temperature coefficient of reactivity of a high temperature reactor, thus improving the safety characteristics of such a reactor.

Various features of the present invention are set forth in the following claims.

What is claimed is:

1. In a high temperature, gas-cooled, graphite moderated reactor, a plurality of fuel elements, each of said fuel elements comprising a container fabricated of neutron moderating material having a low permeability to fission products, a moderator-containing support spine disposed within said container, a plurality of nuclear fuel compacts disposed around said spine within said container, said compacts including an intimate mixture of fuel and moderating material, and selected thermal neutrol absorbing material having thermal resonance bands at energies above about .3 e.v. disposed within said container, the amount of said neutron absorbing material in said fuel elements being sufficient to impart a substantial prompt negative contribution to the temperature coefficient of reactivity of said reactor at temperatures in excess of about 1200° C., thereby improving the safety characteristics of said reactor, said neutron absorbing material being selected from the group consisting of plutonium-240, rhodium-103, erbium-167, and mixtures thereof.

2. A fuel element for a high temperature, gas-cooled, graphite moderated nuclear reactor, which fuel element comprises a container fabricated of graphite having a low permeability to fission products, a graphite-containing support spine disposed within said container, a plurality of nuclear fuel compacts disposed around said spine within said container, said compacts including an intimate mixture of fuel and moderating material, and a chemically stable, thermal neutron absorbing material compatible with said graphite disposed within said container, said neutron absorbing material being present in an amount such that when a plurality of said fuel elements are utilized in a reactor said neutron absorbing material will provide a significant prompt negative contribution to the temperature coefficient of reactivity of said reactor at elevated fuel temperatures above 1200° C., said neutron absorbing material being selected from the group consisting of plutonium-240, rhodium-103, erbium-167, and mixtures thereof.

3. A fuel element for a high temperature, gas-cooled, graphite moderated nuclear reactor, which fuel element comprises a container fabricated of graphite having a low permeability to fission products, a graphite-containing support spine disposed within said container, a plurality of nuclear fuel compacts disposed around said spine within said container, said compacts including an intimate mixture of fuel and moderating material, and a chemically stable, thermal neutron absorbing material compatible with said graphite disposed within said container, said neutron absorbing material being present in an amount such that when a plurality of said fuel elements are utilized in a reactor said neutron absorbing material will provide a significant prompt negative contribution to the temperature coefficient of reactivity of said reactor at elevated fuel temperatures above 1200° C., said neutron absorbing material comprising rhodium-103.

4. A fuel element for a high temperature, gas-cooled, graphite moderated nuclear reactor, which fuel element comprises a container fabricated of graphite having a low permeability to fission products, a graphite-containing support spine disposed within said container, a plurality of nuclear fuel compacts disposed around said spine within said container, said compacts including an intimate mixture of fuel and moderating material, and a chemically stable, thermal neutron absorbing material compatible with said graphite disposed within said container, said neutron absorbing material being present in an amount such that when a plurality of said fuel elements are utilized in a reactor said neutron absorbing material will provide a significant prompt negative contribution to the temperature coefficient of reactivity of said reactor at elevated fuel temperatures above 1200° C., said neutron absorbing material comprising plutonium-240.

5. A fuel element for a high temperature, gas-cooled, graphite moderated nuclear reactor, which fuel element comprises a container fabricated of graphite having a low permeability to fission products, a graphite-containing support spine disposed within said container, a plurality of nuclear fuel compacts disposed around said spine within said container, said compacts including an intimate mixture of fuel and moderating material, and a chemically stable, thermal neutron absorbing material compatible with said graphite disposed within said container, said neutron absorbing material being present in an amount such that when a plurality of said fuel elements are utilized in a reactor said neutron absorbing material will provide a significant prompt negative contribution to the temperature coefficient of reactivity of said reactor at elevated fuel temperatures above 1200° C., said neutron absorbing material comprising erbium-167.

References Cited in the file of this patent

UNITED STATES PATENTS

| | | |
|---|---|---|
| 2,920,025 | Anderson | Jan. 5, 1960 |
| 3,009,869 | Bassett | Nov. 21, 1961 |
| 3,010,889 | Fortescue et al. | Nov. 28, 1961 |

FOREIGN PATENTS

| | | |
|---|---|---|
| 1,187,405 | France | Mar. 2, 1959 |

OTHER REFERENCES

Reactor Handbook, 2nd edit., vol. I, "Materials," p. 778.

Ransohoff: Rare Earths as Nuclear Poisons, Part II, pp. 1 and 2, August 1958. Burnable Poison Digest, a report by Lindsay Chemical Division, West Chicago, Illinois.